United States Patent [19]
Van Sant

[11] Patent Number: 4,856,871
[45] Date of Patent: Aug. 15, 1989

[54] REPLACEABLE LASER AND LENS ASSEMBLY

[75] Inventor: Glen J. Van Sant, Penndel, Pa.

[73] Assignee: General Electric Company, Moorestown, N.J.

[21] Appl. No.: 91,182

[22] Filed: Aug. 31, 1987

[51] Int. Cl.$^4$ .............................................. G02B 7/02
[52] U.S. Cl. .................................... 350/253; 369/122
[58] Field of Search ............... 350/502, 571, 417, 252, 350/253; 369/122

[56] References Cited

U.S. PATENT DOCUMENTS

| | | | |
|---|---|---|---|
| 4,504,935 | 3/1985 | Jansen | 358/213 |
| 4,551,760 | 11/1985 | Bendell | 358/213 |
| 4,587,563 | 5/1986 | Bendell | 369/32 |
| 4,685,303 | 8/1987 | Branc et al. | 369/19 X |
| 4,815,059 | 3/1989 | Nakayama et al. | 369/45 |

Primary Examiner—Frank Gonzalez
Attorney, Agent, or Firm—Raymond E. Smiley; William H. Meise

[57] ABSTRACT

An optical recorder such as a data recorder has an interchangeable, prealigned laser diode/lens module arrangement which can be readily replaced without complex realignment of the recorder. The module includes a cylindrical outer housing/heat-sink, and a tiltable yoke within the outer housing/heat-sink. A heat pump such as a thermoelectric element has a hot side coupled to the yoke, and also has a cold side. A combination mount is at least thermally cantilevered from the cold side of the thermoelectric element, and is thermally isolated from adjacent structures. A laser diode is bonded to a structure within the combination housing, and a lens is loosely mounted at the light-emitting end of the combination housing. The module is prealigned by operating for a period sufficient to achieve thermal stability in a fixture which is dimensionally identical to the optical recorder with which the module is to be used. When thermal stability has been achieved, the yoke is tilted, and the position of the lens is adjusted in order to achieve focus at a selected location relative to the reference plane. The lens is then secured in the selected position. That position will remain constant or substantially constant as the ambient temperature changes. This enables the optical recorder to be operated at any ambient temperature needing virtually no adjustment to the optical alignment.

20 Claims, 6 Drawing Sheets

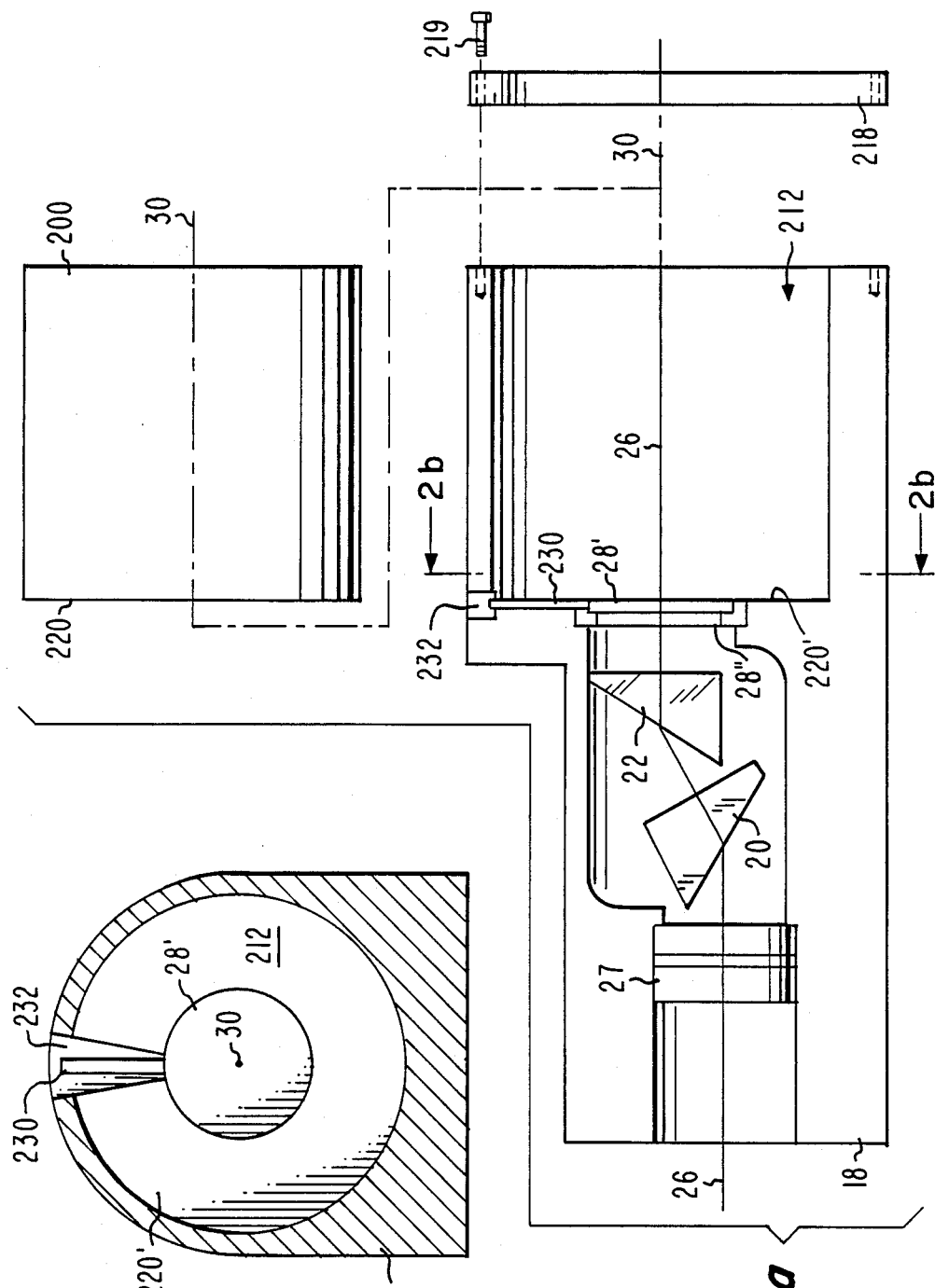

REPLACEABLE LASER AND LENS ASSEMBLY

This invention was made with Government support under Contract No. F30602-85-C-0193 awarded by the Air Force. The Government has certain rights in this invention.

This invention relates to an assembly of a light-emitting device such as a laser diode with a focussing lens, which is arranged as a modular unit which focusses the light emitted at a predetermined distance from a reference plane.

Modern data techniques may require the handling and storage of large amounts of high-rate data. For example, data processing and storage at rates in excess of tens of megabits per second may be required. Optical disc recorders have been devised for recording and reproducing data at such high data rates by means of focussed light beams. Permanent optical storage discs for archival purposes are known in which recording is accomplished by a high-intensity focussed data-modulated light beam, which forms a permanent pattern of data-representative pits on the record track. The pits have a reflectivity which differs from that of the surrounding surface of the disc medium, and their presence or absence may be detected by the changes in the magnitude of the light reflected by the recorded and unrecorded portions of the disc in response to a low-intensity read light beam. Reusable recording media are also known in which a data-modulated high-intensity light beam makes reversible changes in the polarization characteristics of the medium surface. Such media may be erased by the annealing effect of a gradually-decreasing intensity erase light beam. Reading is accomplished in one such system by comparing the polarization of the reflections from recorded and unrecorded portions of the surface of the medium when illuminated by a low-intensity read light beam.

In optical data recorders, the light-emitting device is often a solid-state laser diode or array of laser diodes. At the present state of the art, such laser diodes have light-emitting characteristics as a function of drive current which change from time to time as the diodes age. Also, probably because of the relatively high electrical drive required to achieve the intense light required for recording onto the record medium or for erasing erasable media, the laser diodes are subject to failure. When a laser diode of a laser diode array fails, it may be possible to switch to an unused diode of the array. Ultimately, however, the laser diode or laser diode array must be replaced.

When the laser diode or laser diode array of a recorder is replaced, the light-emitting point of the replacement diode(s) must be placed in precisely the same position as that of the previous diode in order to achieve focus at the surface of the disc, or the optical system must be realigned in order to achieve the desired performance. Exact placement of the laser diode is difficult to accomplish because the laser diode, when in operation, may produce a great deal of heat, which changes its temperature and that of the surrounding support structures. As known, the dimensions of the support structures may change under the influence of temperature, thereby affecting the point of focus. Realignment of the optics may require specialized test fixtures, and may also require the changing of lenses.

The recorder may be used at a location at which specialized optical alignment gear and techniques are not readily available. In that event, the data recorder in which the laser diode has failed must be returned to the factory for installation of a new laser diode(s) and for realignment. As a result, the data recorder is unavailable to its user for a protracted period, or the user must keep on hand spare units, which may be a considerable expense, as well as requiring inventory control.

It is desirable to arrange an optical data recorder with a light-emitting module which can be readily interchanged by relatively unskilled personnel.

SUMMARY OF THE INVENTION

A data recorder/playback apparatus (recorder) using a light-sensitive medium includes means for generating relative motion between the medium and a light beam. A mutually orthogonal reference plane and reference axis are provided in the recorder, and an optical system accepts light leaving the reference plane parallel with the reference axis and translates it to the medium. A modular combination of a light-emitting device and a lens includes a second mutually orthogonal reference plane and axis, and is prealigned to cause the light to leave parallel with the second axis, and to focus at a predetermined distance from the reference plane. The reference plane and axis of the modular combination are readily made congruent with the reference plane and axis of the recorder, so that any prealigned modular combination may be used with the recorder, without further complex alignment.

According to another aspect of the invention, the modular combination includes a focussing lens and a light-emitting device which may require cooling during operation. A heat pump including a cold surface and a hot surface is adapted to be energized for cooling the light-emitting device. A first mechanical and thermal coupler is coupled to the cold surface of the heat pump, to the light-emitting device, and to the lens, for holding the lens in a selectable position on the axis and before the light-emitting device, at least thermally cantilevered from the cold surface of the heat pump. The first mechanical and thermal coupler is constructed from materials, dimensioned and thermally isolated from adjacent structures such that, during operation, a substantially uniform temperature is maintained over the entirety of the first mechanical and thermal coupler. A second mechanical and thermal coupler is connected to the hot side of the heat pump for holding the first mechanical and thermal coupler and its associated lens and light-emitting device, and the heat pump, at least thermally cantilevered in position with the axis substantially orthogonal to a reference plane, and for sinking heat received from the hot side of the heat pump. The selectable position of the lens is selected, and the lens is fixed in the selected position, under normal operating conditions, with the light beam focussed at a predetermined distance before the reference plane.

DESCRIPTION OF THE DRAWING

FIGS. 2a and 2b, referred to jointly as FIG. 2, illustrate in FIG. 2a a simplified schematic view, partially exploded, of the optical system including a common reference plane and axis, the recorder housing and the modular light source of FIG. 1, and in FIG. 2b illustrates a cross-section of the recorder housing illustrating the reference surface and axis;

FIG. 3 is an exploded perspective or isometric view of the modular light source of FIGS. 1 and 2, illustrating a cylindrical module housing which mates with the recorder housing of FIGS. 1 and 2 to make the reference planes and axes congruent, first and second mechanical and thermal coupling elements coupled to the cold and hot sides, respectively, of a thermoelectric cooler, a laser diode and mount, and a lens and lens mount;

FIGS. 7a, 7b and 7c, referred to jointly as FIG. 7, in FIGS. 7a and 7b are laser-side and rear, respectively, perspective or isometric views of the laser diode mount of FIG. 3, and an end view of the laser diode illustrating its relationship to the axis; and FIGS. 8a and 8b, referred to jointly as FIG. 8, are axial and cross-sectional views, respectively, of the lens mount of FIG. 3.

DESCRIPTION OF THE INVENTION

Figure 1:
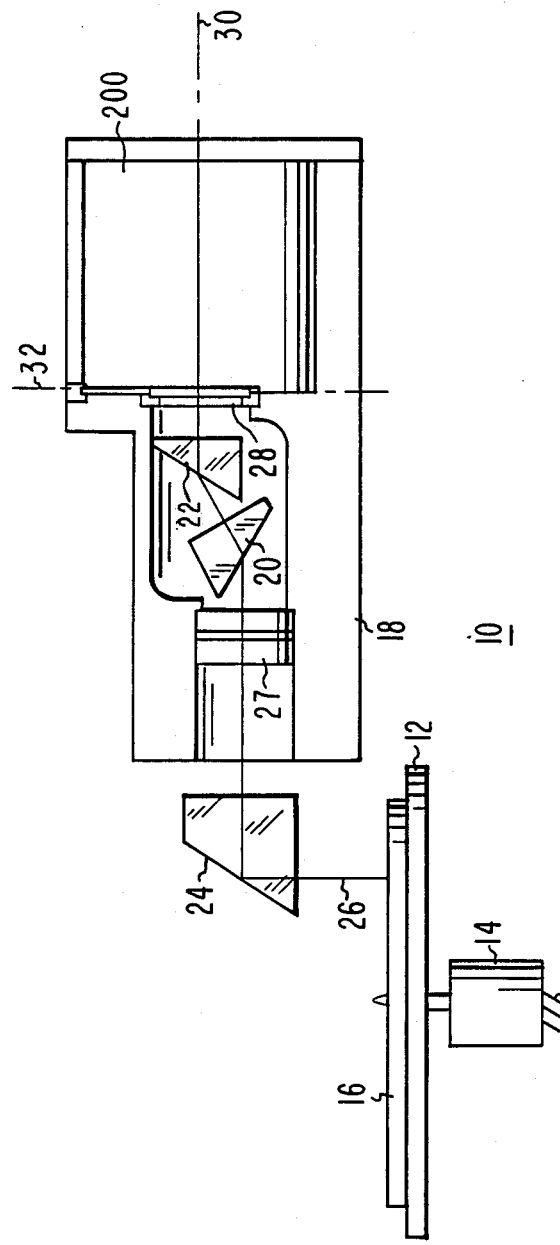
FIG. 1 is a simplified schematic view of an optical recorder including an optical disc recording medium, a motor for spinning a turntable, a recorder housing, a common reference plane and common axis, a modular light source, and an optical system.

FIG. 1 is a simplified schematic representation of an optical disc recorder/playback arrangement (recorder) 10. Recorder 10 of FIG. 1 includes a turntable 12 driven by a motor 14 for rotary motion. Motor 14 is fixed to the housing 18 of the recorder. A photosensitive disc 16 is mounted on turntable 12 for rotation therewith. Also fixed to housing 18 of the recorder is an optical system including beam expanding prisms 20 and 22, a further prism 24 having a mirrored face for reflecting a light beam or beams, illustrated as a line 26, toward the disc, spectrum limiting wave plates and gratings illustrated together as 28, and other optics represented as 27 required to translate a light beam 26 entering the optical system along or parallel with an optical axis 30 to the disc. Translation of the light beam(s) may include control of the polarization, focussing or defocussing in response to operating mode, beam expansion or contraction, control of the cross-sectional dimensions, beam splitting or combining, offset position and other functions required for operation of the recorder.

In FIG. 2, elements corresponding to those of FIG. 1 are designated by corresponding reference numerals. FIG. 2a illustrates recorder housing 18, with a removable modular light source 200 insertable into a cavity 212 therein. FIG. 2b is a cross-section of the arrangement of FIG. 1a, with module 200 removed, taken in the direction of section lines 2b—2b. Modular light source 200 has the general shape of a right circular cylinder and it fits fully into a right circularly cylindrical cavity 212. Cavity 212 has a central axis 30. Since modular light source 200 has an external shape which is cylindrical to match the shape of cavity 212, modular light source 200 is also symmetrical about axis 30 when inserted into cavity 212, and may be rotated about the axis for adjustment. A cavity dust cover 218 covers the right end of cavity 212 and is held in place by screws, one of which is illustrated as 219. In operation, modular light source 200 emits light beam(s) 26 congruent with or parallel with axis 30.

The left end of modular light source 200 as illustrated in FIG. 2a includes a flat reference surface illustrated as 220 which is orthogonal to axis 30. Surface 220 is congruent with a reference plane, and is hereafter referred to as reference plane 220 for modular light source 200. Cavity 212 includes matching flat reference surface or reference plane 220', against which reference plane or surface 220 mates when modular light source 200 is fully inserted into cavity 212. When assembled, therefore, the axes 30 are congruent and the reference planes 220 of cavity 212 and of modular light source 200 are congruent.

Also illustrated in FIG. 2 is a lever 230 fitted into a sectional notch 232 cut into recorder housing 18 to a depth, as viewed in FIG. 2b, below reference surface 220'. The inner end of lever 230 is attached to an optical grating 28' to permit small rotary positional adjustments thereof, for controlling polarization-sensitive characteristics of the light beam. A spectrum-limiting waveplate is illustrated as 28" in FIG. 2.

FIG. 3 is an exploded perspective or isometric view of modular light source 200 of FIGS. 1 and 2. In FIG. 3, an outer housing 410 of modular light source 200 has the exterior shape of a right circular cylinder centered on axis 30. At the left end of module housing 410 of FIG. 3, reference surface 220 defined by the end of module housing 510 can be seen to be annular, and coincident with a reference x-y plane which is orthogonal to axis 30. Housing 410 is formed from a thermally conductive material such as aluminum. As described below, housing 410 provides mechanical and thermal support for structures supporting the light emitting device, which may be a laser diode.

Figure 4A:
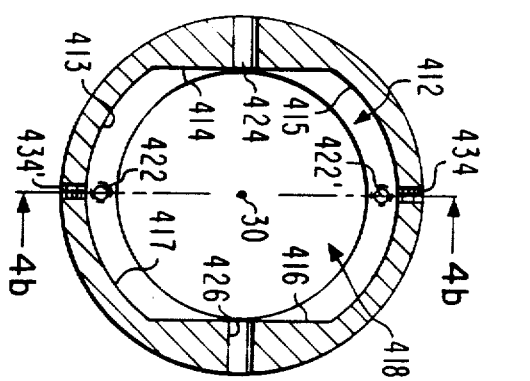
FIGS. 4a, 4b and 4c, referred to jointly as FIG. 4, are cross-sections of the module housing of FIG. 3.
Figure 4B:
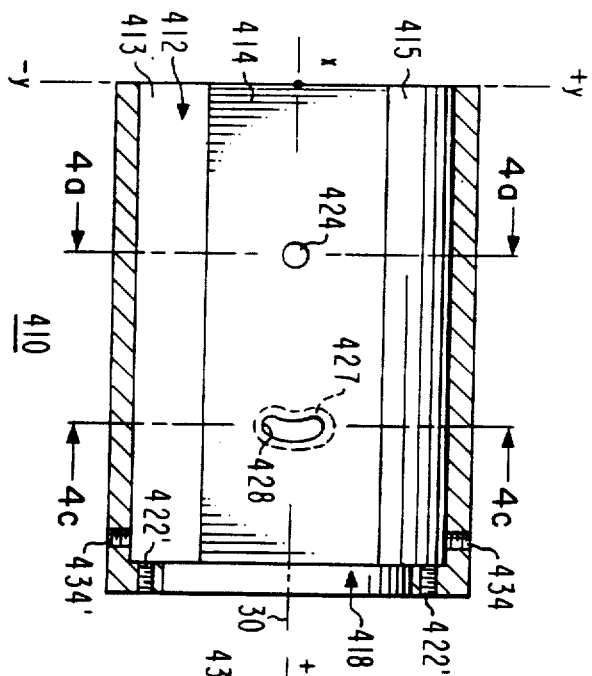

Housing 410, which is illustrated in axial and side cross-sectional views in FIGS. 4a and 4b, includes a through central cavity 412 having a cross-section over the principal portion of its length which includes mutually opposed first and second straight sides 414 and 416. Other portions 415, 417 of the interior of cavity 412 are curved or circular. Housing 410, as illustrated in FIG. 3, is partially cut away to reveal interior details. At the extreme rear end of housing 410 is a circular aperture 418 having a smaller diameter than the diameter between circular surfaces 415 and 417. A dust cover 320 is affixed to the rear of housing 410 by a plurality of screws, one of which is illustrated as 322, for covering aperture 418.

Figure 4C:
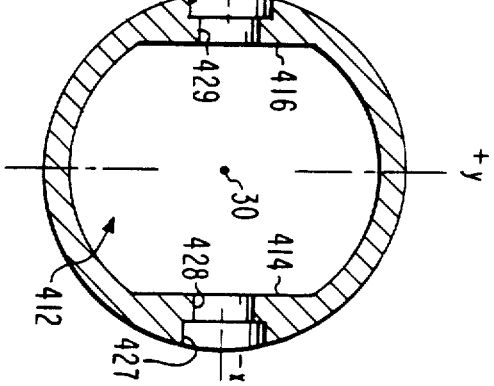

Referring to FIGS. 3 and 4, a pair of coaxial apertures 424, 426 are defined through the walls of housing 410, centered between the upper and lower sides of flat portions 414, 416. A further pair of curved through slots 428, 429 penetrate the walls of housing 410 with a radius centered on the axis of apertures 424, 426. As illustrated in the cross-section of FIG. 4c, the outer portion of the walls of housing 410 in the region around slots 428, 429 is undercut by depressions 427, 430, respectively, for the purpose of countersinking the heads of screws described below. A pair of coaxial jackscrews 332, 332', with their common axis disposed parallel with the Y axis, are threaded into threaded through holes 434, 434', respectively, formed in the sides of housing 410, as illustrated in FIG. 3.

In FIG. 4a, threaded apertures 422' formed in the back wall of housing 410 are visible. Threaded apertures 422' accept screws 322 (FIG. 3) for holding dust cover 320 (FIG. 3) onto housing 410.

Figure 5B:
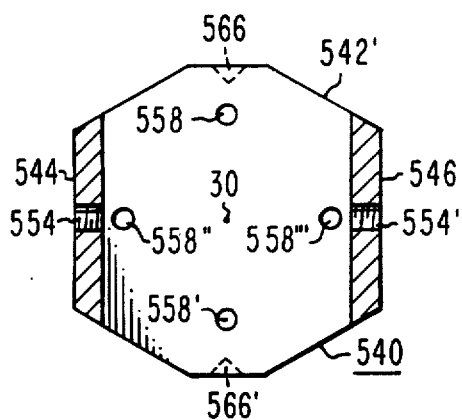
FIGS. 5a, 5b and 5c, referred to jointly as FIG. 5, are elevation, cross-sectional and plan views, respectively, of the second mechanical and thermal coupling element of FIG. 3.
Figure 5A:
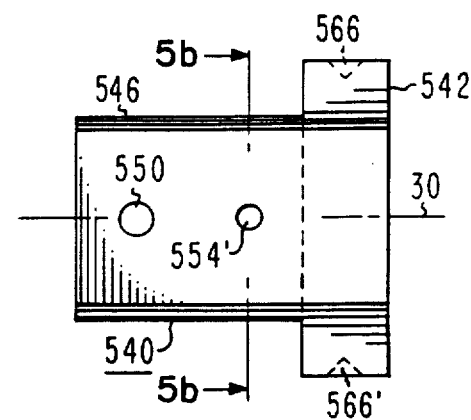
Figure 5C:
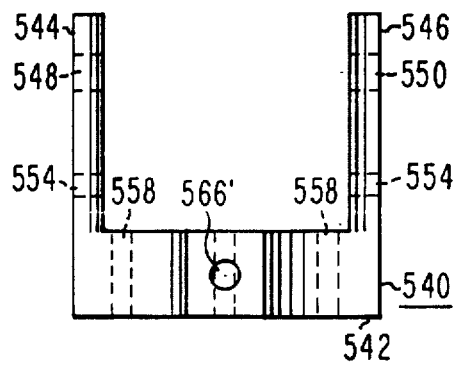

A furcated copper yoke, designated generally as 540 in FIG. 3, is illustrated in three views in FIG. 5. As illustrated in FIGS. 3 and 5, yoke 540 includes a thick, flat baseplate 542 having an approximately octagonal peripheral shape. A pair of yoke arms 544 and 546 extend in a forward direction from baseplate 542. A pair of smooth-sided coaxial apertures 548, 550 are formed through the sides of yoke arms 544 and 546, respectively. Apertures 548 and 550 have the same dimensions as apertures 524 and 526 formed in housing 410, as illustrated in FIG. 3, and are adapted to receive trunnion pins, one of which is illustrated as 352 in FIG. 3. Arms 544 and 546 are also penetrated by threaded holes 554, 554', respectively, which are adapted to receive a pair of screws, illustrated as 356, 356' in FIG. 3.

Baseplate 542 of yoke 540 has formed therein a set of four apertures 558—558''', best seen in FIG. 5b. Apertures 558 are clearance holes for screws, one of which is illustrated as 360 in FIG. 3. Screws 360 are used for holding in place, as described below, a thermoelectric or Peltier-effect heat pump or cooler illustrated as 362 in FIG. 3. Heat pump 362 pumps heat from a cold plate or cold surface 364 to a hot plate or hot surface 365. A suitable thermoelectric cooler is type FCO.6-32-06L manufactured by Melcor Corporation. The pattern of apertures 558 in baseplate 542 is selected in conjunction with the dimensions of cooler 352. Thermoelectric cooler 362 is energized by electrical power applied thereto through electrical leads 363, 363'. Leads 363, 363' are led from housing 310 in any convenient manner. As described below, a temperature sensor may be used in conjunction with thermoelectric cooler 362 for feedback control of the temperature of cold face 364.

A pair of conical recesses 566, 566' are formed in upper and lower flat edges of baseplate 542 of yoke 540. When assembled, yoke 540, together with thermoelectric cooler 362 fastened thereto, fits within cavity 412 defined by housing 410, with yoke arms 544 and 546 fitted snugly to flat surfaces 414 and 416 in the interior of housing 410. Trunnion pin 352 passes through apertures 426 and 550, and another trunnion pin (not illustrated) passes through apertures 424 and 548, and both are fastened in any convenient manner, for permitting yoke 540 and the attached thermal cooler 362 to pivot slightly within housing 410. When so assembled, the ends of jackscrews 332, 332' fit into conical recesses 566, 566' formed in baseplate 542 of yoke 540. Jackscrews 332, 332', when alternately loosened and tightened, allow fine control of the exact position of yoke 540 within housing 410, and also secure it in position when the desired position has been achieved. Locking screws 356 and 356', extending through slots 429 and 428, respectively, and into threaded holes 554', 554, respectively, prevent inadvertent misadjustment. As mentioned, the heads of screws 356 are allowed to sink below the outer surface of housing 410 because of the undercutting illustrated as 427, 430 in FIG. 4c.

Referring to FIG. 3, a combination mounting illustrated as 600 for a light-emitting device and a lens includes relatively thick copper walls 603 with a circularly cylindrical outer surface 605. As illustrated in FIG. 3, combination mounting 600 is partially cut away to illustrate interior details. Combination mounting 600 is further illustrated in FIG. 6. A cavity or chamber 606 is defined within walls 603, with interior surface 612 also in the form of a right circular cylinder. Integral with walls 603 is a floor 608 closing off one end of cavity 606. Floor 608 has a relatively flat exterior surface 609, clearly visible in FIG. 6b.

Figure 6A:
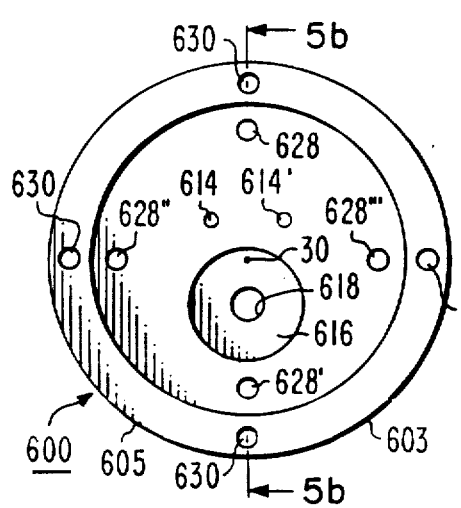
FIGS. 6a and 6b, referred to jointly as FIG. 6, are axial and cross-sectional views, respectively, of the first mechanical and thermal coupling element of FIG. 3.
Figure 6B:
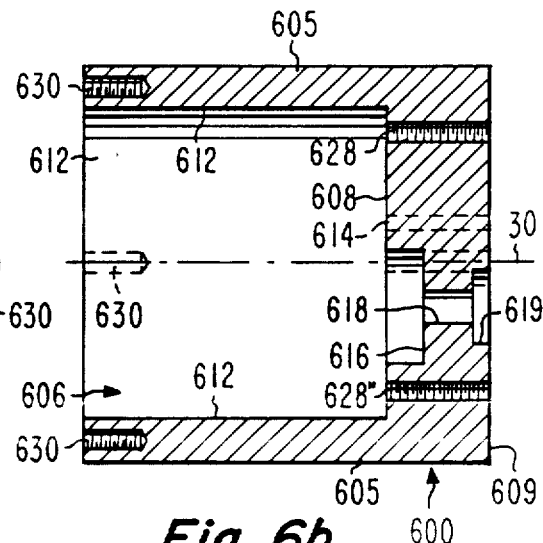

Referring now to FIGS. 3, 6a, and 6b, floor 608 of mounting 600 can be seen to be penetrated by four threaded apertures designated 628—628'''. The pattern of holes 628 matches the pattern of holes 558 formed in baseplate 542 of yoke 540. Screws, two of which are illustrated as 360, 360' in FIG. 3, pass through clearance holes 558, 558' in yoke 540, and thread into threaded apertures 628, 628' of mounting 600, in order to draw bottom surface 609 of floor 608 of combination mounting 600 toward baseplate 542 of yoke 540, with thermoelectric element 362 sandwiched therebetween. Thus, thermoelectric element 362 is held in place with its cold surface 364 flat against bottom surface 609 of floor 608, and with its hot surface 365 flat against a surface of yoke baseplate 542. The mating surfaces between surface 609 of mounting 600 and cold plate 364, and between hot plate 365 and base plate 542 of yoke 540 may be coated with a thermally conductive grease to enhance thermal conductivity, as known in the art. Such thermally conductive grease may also be advantageously used at the interface between yoke arms 544, 546 and flat surfaces 414, 416 in the interior of module housing 410.

While it might appear that the screws which hold mounting 600 to base plate 542 constitute a thermal short-circuit between the cold and hot sides of thermoelectric element 362, their relatively great length with relation to their diameter reduces the thermal conduction by this path to a relatively negligible level. By selecting a material for the screws which has a relatively low thermal conductivity, such as stainless steel, the thermal conduction may be further reduced. From a thermal point of view, therefore, mounting 600 is connected only to cold plate 364 and is effectively thermally "cantilevered" from cold plate 364, even though it is not mechanically cantilevered from cold plate 364. In this context, thermal cantilevering means that there are no structures affixed to or connected to the structures attached to cold plate 364 which conduct thermally to any structures connected to hot plate 365 of cooler 362.

Bottom floor 608 of mounting 600 is bored part-way through to form a depression, illustrated by 616 and best seen in FIG. 6, for accepting a mounting stud of a laser diode mount. Bore 616 encompasses axis 30. At the center of bored portion 616 is a smaller through aperture 618, dimensioned to clear a screw (illustrated as 750 in FIG. 3) for fixing the laser diode mount (700 of FIG. 1) within chamber 606 of combination mount 600. A further bored portion 619 is formed in rear surface 609 of floor 608 of combination mount 600 for countersinking the head of screw 750.

A pair of apertures 614, 614' (FIG. 6a) is formed at a convenient location through floor 608. These locations are selected for convenient passage therethrough of conductors for the energization of the laser diode.

A laser mounting element 700 is affixed to a laser diode 740 as illustrated in FIG. 3, and the combination fits within cavity 606 of combination mount 600. Details of laser diode mounting 700 are illustrated in FIG. 7.

FIG. 7a is a perspective view of laser diode mounting arrangement 700, illustrating its relationship with laser diode 740. Laser diode mounting 700 is generally disc-shaped, with a diameter only slightly less than the inner diameter of chamber 606 of combination mount 600. As illustrated in FIG. 7a, laser diode mounting 700 includes a steel disc 710, the edge of which includes a plurality of steps 712 having no significance to the invention, and a further copper-tellurium alloy (ASTM B301) stud 714 swaged into a bore through disc 710. Stud 714 includes a flat 716 to which laser diode 740 is bonded, as by soldering or welding. Stud 714 penetrates through disc 710 as illustrated in FIG. 7b, and extends beyond rear surface 716 of disc 710. A threaded aperture 718 is centrally located in, and accessible from the rear of stud 714. A screw illustrated as 750 fits threaded aperture 718 and, as mentioned in conjunction with FIG. 3, holds stud 714 of laser diode mount 700 fixedly in place against the inner surface of floor 608 of mounting 600. Referring once again to FIGS. 7a and 7b, power for the laser diode is provided by a pair of conductive rods 730, 732 which pass through copper disc 710 and are insulated therefrom by glass inserts 740, 742, respectively. Conductive rods 730 and 732 are coupled to the laser diode by bond wires (not illustrated).

Laser diode 740 is bonded to flat 716 with the lasing portion centered, insofar as possible, at a height above flat 716 selected to place the lasing portion congruent with axis 30, as illustrated in FIG. 7c. The x and y axes are illustrated in FIG. 7c for reference only, as the lasing surface is to the rear of the reference x-y plane in the assembled modular light source 200.

Referring once again to FIG. 3, the open end of cavity 606 of mounting 600 is closed by a lens holder 800 in the general form of a disc with a central aperture. Details of lens holder 800 are illustrated in FIG. 8.

In FIG. 8, central aperture 812 can be seen together with an annular depression 814 concentric with central aperture 812. A radial hole 816 communicates with depression 814. A plurality of clearance holes 818 are dimensioned to clear mounting screws, one of which is illustrated as 370 in FIG. 3, for mounting lens holder 800 over the open end of cavity 606 of combination mount 600, with the body of screws 370 threaded into apertures 630 in walls 603 of combination mount 600.

A focussing lens illustrated in FIG. 3 as 372 includes a cylindrical portion 374 dimensioned to fit within central aperture 812 of lens mount 800. When the final position of lens 372 has been selected, a hardenable liquid is injected through hole 816 in the edge of lens mount 800, and runs through depression or groove 814 to completely surround portion 374 of lens 372. The hardenable liquid is then allowed to harden to fix lens 372 in the selected position. The hardenable liquid may be an epoxy resin.

When modular light source 200 has been assembled and tested for operation, but before the position of lens 372 is fixed, modular light source 200 is mounted in a test fixture which is dimensionally identical to that of an operating recorder such as that illustrated in FIG. 1. The laser diode 740 and thermoelectric cooler 362 are then energized, with feedback control of the temperature, if such is used in the final recorder, and operation is allowed to continue until the temperature stabilizes. Once the temperature has stabilized, combination mount 600, because of its thick walls and the thermal conductivity of the materials of which it is constructed, and because it is thermally isolated from adjacent heat-sinking structures (except for screws 360, which are negligible), assumes a substantially constant temperature, without thermal gradients thereacross. Similarly, laser diode mount 700 and lens mount 800 are at the same temperature as that of combination mount 600. Since the combination mount, laser diode mount, and lens mount 800 are at the operating temperature without thermal gradients thereacross, the dimensions are the same as those which occur during normal operation, except for variations due to room ambient. If a temperature sensing element (not illustrated) is affixed to cold plate 364 or to any portion of mounting 600, and used for control of the temperature thereof, the cold temperature will be stabilized. Consequently, the dimension of the combination mount, laser diode mount, lens mount and lens will be identical to those used during initial alignment, regardless of the ambient temperature.

Similarly, after the temperature has stabilized, the temperature of yoke 540 and housing 410 will be essentially at room temperature, with very small thermal gradients which might result in indeterminate dimensions. Consequently, after thermal stabilization, laser diode 740 will be at the same distance from the reference X-Y plane as it will be during normal operation in a recorder. Thus, one mounting requirement is thereby fulfilled.

As mentioned, the light beam emitted by laser diode 740 may not be exactly parallel to axis 30, because of slight imperfections in the mounting procedure. An alignment is performed to produce a light beam parallel with axis 30 which is focussed at a precise distance from the X-Y reference plane by loosening lock screws 356, and adjusting jackscrews 332, 332' in order to tilt the yoke 540, thermoelectric element 362, combination mount 600, laser diode mount 700, lens mount 800, and lens 372 to bring the beam of light emitted by laser diode 740 parallel with axis 30. The axial position of lens 372 is then adjusted to produce focus at the precise desired distance from the reference x-y plane, and the liquid epoxy is injected as by a syringe, illustrated in FIG. 3 as 376, into hole 816 to fill depression 814 and thereby hold lens 372 in the selected position.

Other embodiments of the invention will be apparent to those skilled in the art. For example, instead of connecting combination mount 600 to base plate 542 of yoke 540 with screws, bottom surface 609 of combination mount 600 may be bonded, as by use of a thermally conductive epoxy, to cold plate 364 and hot plate 365 of thermoelectric element 362 may be attached by screws to base plate 542, thereby mechanically cantilevering, as well as thermally cantilevering the combination mount, laser diode mount, lens mount, and lens from cold plate 364. Also, instead of stainless steel screws such as 360, 360' of FIG. 3, screws of materials such as nylon could be used for even lower thermal conduction.

What is claimed is:

1. A replaceable assembly including a light-emitting device for an optical apparatus requiring a focussed light beam at a predetermined distance from a reference plane, said assembly comprising:

a light-emitting device for emitting light in a forwardly direction parallel with an axis, said light emitting device requiring cooling during normal operation;

a lens to focus said light;

a heat pump including a cold surface and a hot surface;

first mechanical and thermal coupling means coupled to said light-emitting device, to said lens, and at a heat transfer surface to said cold surface of said heat pump, for forming a mechanical combination, said first mechanical and thermal coupling means being arranged for holding said lens in a selectable position before said light-emitting device, said first mechanical and thermal coupling means being constructed from a material dimensioned and thermally isolated from adjacent structures such that, in operation, said lens and said light emitting device are at least thermally cantilevered from said cold surface of said heat pump, and a substantially uniform temperature is maintained over the entirety of said first mechanical and thermal coupling means, second mechanical and thermal coupling means, said second mechanical and thermal coupling means being at least thermally coupled at a heat transfer surface to said hot surface of said heat pump and mechanically coupled to at least said first mechanical and thermal coupling means for holding said mechanical combination of said light emitting device, said lens, said first mechanical and thermal coupling means, and said heat pump in a position with said axis substantially orthogonal relative to a reference plane, said second mechanical and thermal coupling means being thermally coupled for sinking heat transferred thereto by said hot surface of said heat pump; and wherein said selectable position of said lens relative to said light-emitting device is selected at normal operating temperature and condition of said lens, light-emitting device, heat pump, and first and second mechanical and thermal coupling means to produce focus at said predetermined distance from said reference plane, whereby the positions of said lens and said light emitting device relative to said reference plane are repeatable at said operating temperature and condition, and said assembly may be freely substituted for another like assembly for producing focussed light at said predetermined distance from any reference plane.

2. An assembly according to claim 1, wherein said light emitting device comprises a laser.

3. An assembly according to claim 1, wherein said first mechanical and thermal coupling means comprises a right circular cylindrical structure defining a cavity including inner walls and also including a floor at one end of said cylindrical structure, said floor being flat on the exterior of said structure near the region at which it is coupled to said cold surface of said heat pump, said floor in the interior of said cavity comprising a mesa which includes a flat portion adapted for supporting said light emitting device, said cavity further being defined by a further portion of said structure which closes, but for a window, the end of said right circular cylinder which is opposite to said floor, said window being adapted for support of said lens.

4. An assembly according to claim 3, wherein said right circular cylindrical structure is formed from copper.

5. An assembly according to claim 3, wherein said window defines an annular support surface for said lens; and
said annular support surface comprises an annular groove.

6. An assembly according to claim 5, wherein at least the region between said annular groove and an edge of said lens is filled with a hardenable liquid.

7. An assembly according to claim 5, wherein said liquid is hardened.

8. An assembly according to claim 7, wherein said hardened liquid is an epoxy resin.

9. An assembly according to claim 3, wherein said second mechanical and thermal coupling means comprises a right circular cylindrical shell defining an axis and a central chamber dimensioned for containing said mechanical combination without contact by the exterior of said right circular cylindrical structure of said first mechanical and thermal coupling means.

10. An assembly according to claim 9, wherein:
said second mechanical and thermal coupling means is at least bipartite, and includes, in addition to said right circular cylindrical shell, a further support element including a flat portion, said further support element being dimensioned with at least a second portion which closely fits within the interior of said shell of said second mechanical and thermal coupling means, said further support element being coupled, for at least one of mechanical support and thermal contact, to said hot surface of said heat pump; and
said second mechanical and thermal coupling means further comprises hinge means coupled to said further support element and to said circular cylindrical shell for supporting said further support element with said flat portion substantially perpendicular to said axis of said circular cylindrical shell but movable from said plane perpendicular to said axis of said circular cylindrical shell to planes skewed thereto.

11. An assembly according to claim 9 wherein said reference plane passes across one end of said right circular cylindrical shell of said second mechanical and thermal coupling means.

12. An assembly according to claim 3 wherein said mesa is removably attached to said floor of said right circular cylindrical structure of said first mechanical and thermal coupling means.

13. An assembly according to claim 1, wherein said heat pump is sandwiched between surfaces of said first and second mechanical and thermal coupling means.

14. An assembly according to claim 1, wherein a plurality of fastening means pass between said heat transfer surfaces of said first and second mechanical and thermal coupling means for tending to draw said surfaces together, thereby holding said heat pump in place therebetween.

15. An assembly according to claim 10, wherein the interfaces between said heat pump and said heat transfer surfaces of said first and second mechanical and thermal coupling means are coated with thermally conductive grease.

16. An assembly according to claim 10, wherein said second portion of said further support element includes a pair of arms, each including a flat face; and
said central chamber of said right circular cylindrical shell of said second mechanical and thermal coupling means comprises a pair of opposed flat faces corresponding to said flat faces of said pair of arms.

17. An assembly according to claim 16 wherein said hinge means comprises at least a pair of coaxial trunnion pins, each of which is coupled to one arm of said pair of arms of said further support element, and each of which is also coupled to one flat face of said pair of opposed flat faces of said central chamber of said right circular cylindrical shell of said second mechanical and thermal coupling means.

18. An assembly according to claim 17 further comprising a pair of coaxial jackscrews threaded through said right circular cylindrical shell of said second mechanical and thermal coupling means, said jackscrews being adapted for bearing against a portion of said further support element for controlling the movement from said plane perpendicular to said axis of said circular cylindrical shell to planes skewed thereto, the axis of said coaxial jackscrews being offset from the axis of said coaxial trunnion pins.

19. An assembly according to claim 10 further comprising a pair of coaxial jackscrews threaded through said right circular cylindrical shell of said second mechanical and thermal coupling means, said jackscrews being adapted for bearing against a portion of said further support element for controlling the movement from said plane perpendicular to said axis of said circular cylindrical shell to planes skewed thereto.

20. A data recording apparatus adapted for transducing data with a light-sensitive recording medium, comprising:

recording medium transport means arranged for relative movement of the recording medium relative to a light beam;

a first axis and a first reference plane associated with said transport means, said first reference plane being orthogonal to said first axis;

a modular combination of laser diode means and lens means prealigned for generating and focusing said light beam from said laser diode at a fixed point in space relative to a second axis and a second reference plane associated with said modular combination, said second reference plane being orthogonal to said second axis; and an optical system arranged between said first reference plane and said recording medium for translating said light beam to said recording medium when said first and second axes, and said first and second reference planes are congruent, whereby said modular combination may be readily substituted for another like modular combination.

* * * * *

UNITED STATES PATENT AND TRADEMARK OFFICE
CERTIFICATE OF CORRECTION

PATENT NO. : 4,856,871

DATED : August 15, 1989

INVENTOR(S) : Glen James VanSant

It is certified that error appears in the above-identified patent and that said Letters Patent is hereby corrected as shown below:

The patent should have also included FIGURES 3-8b as shown on the attached four sheets.

Column 4, line 13, before "220" insert --220' and--.

Signed and Sealed this

Nineteenth Day of June, 1990

Attest:

HARRY F. MANBECK, JR.

*Attesting Officer*    *Commissioner of Patents and Trademarks*

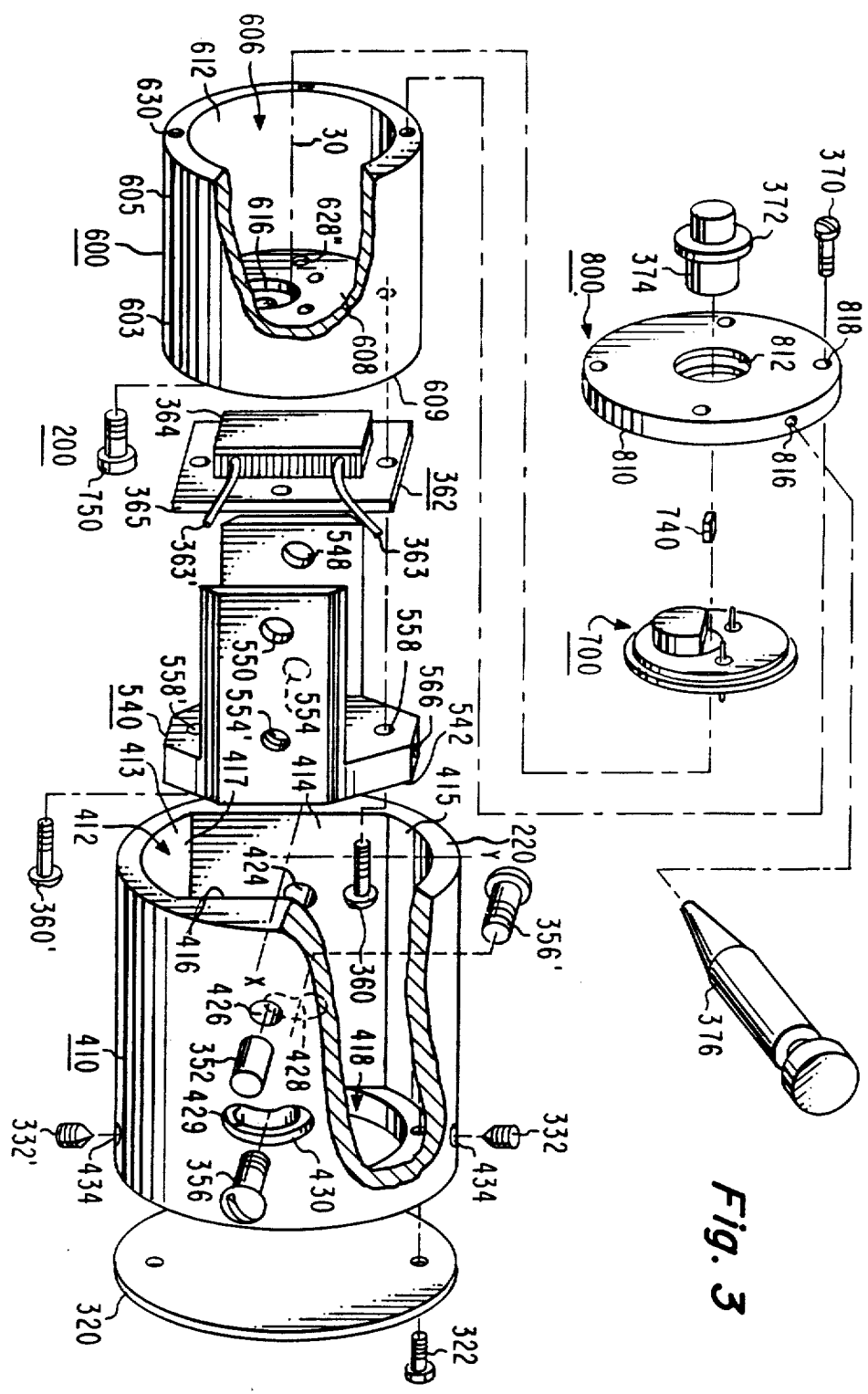

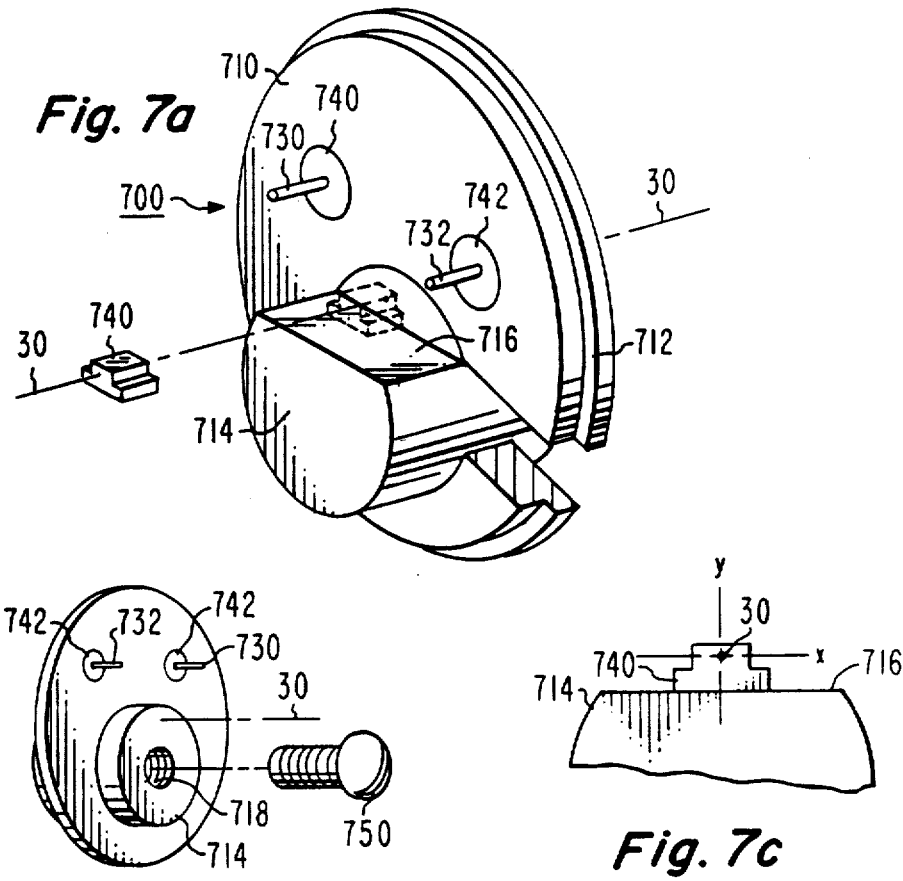
Fig. 7a
Fig. 7b
Fig. 7c
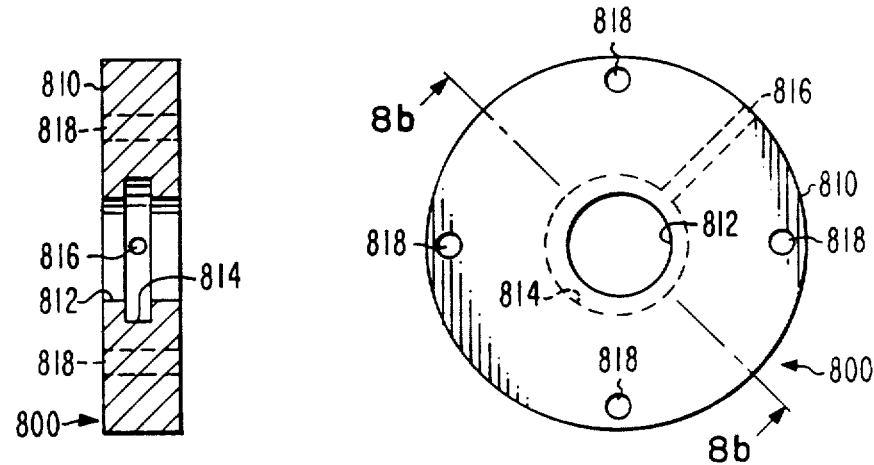
Fig. 8b
Fig. 8a